Jan. 17, 1961 H. R. DE MALLIE 2,968,137
METHOD AND APPARATUS FOR FORMING CONNECTED BOXES
Filed Oct. 28, 1957 7 Sheets-Sheet 1

Howard R. De Mallie
INVENTOR.

BY R. Frank Smith
J. Griffin Little
ATTORNEYS

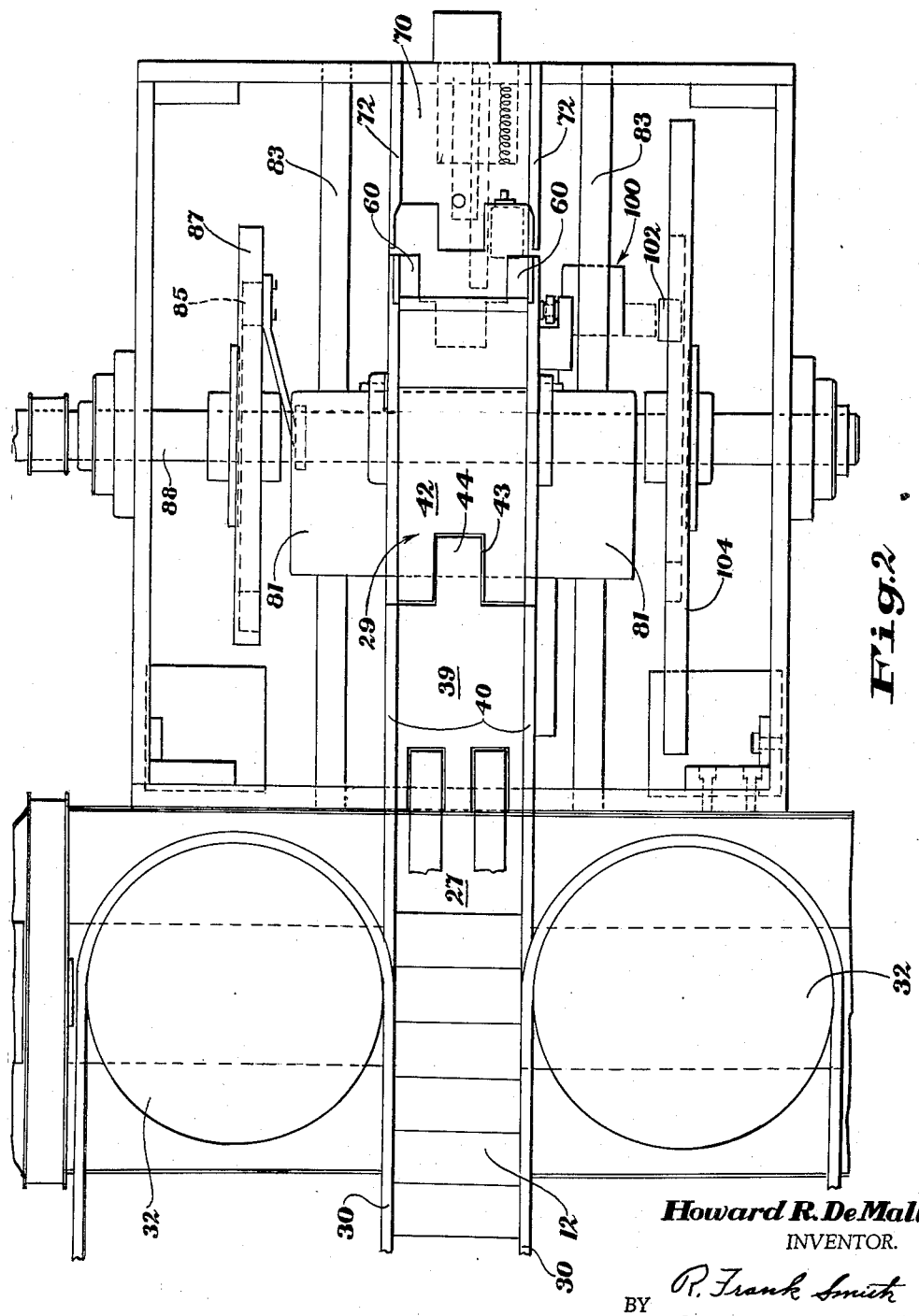

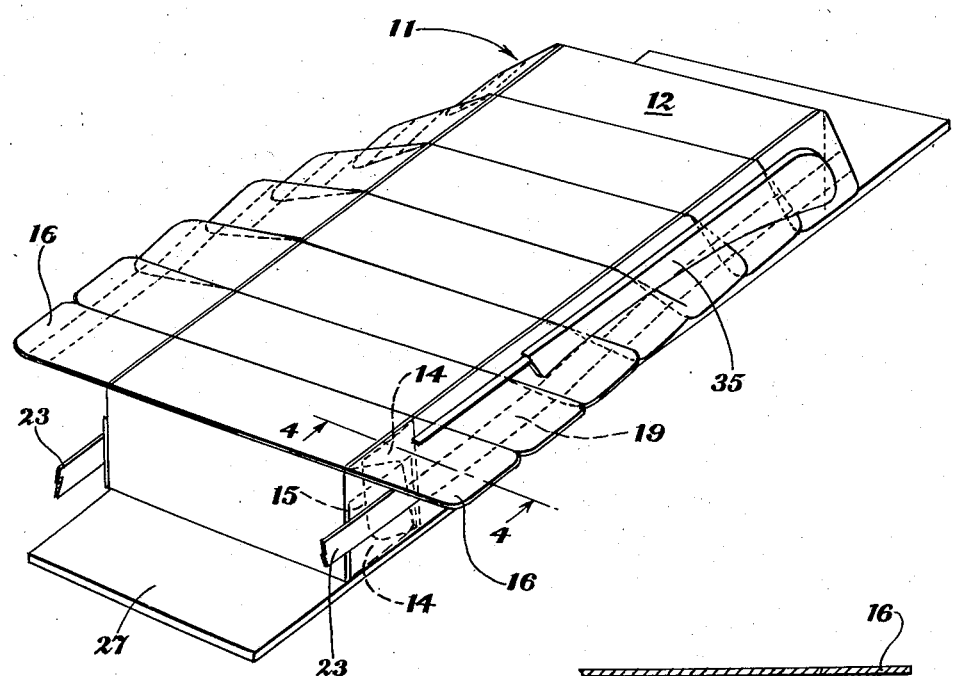
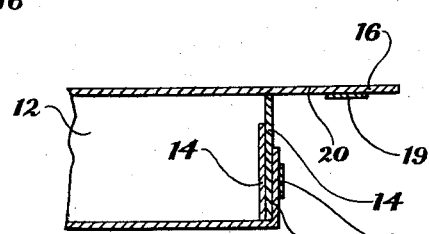
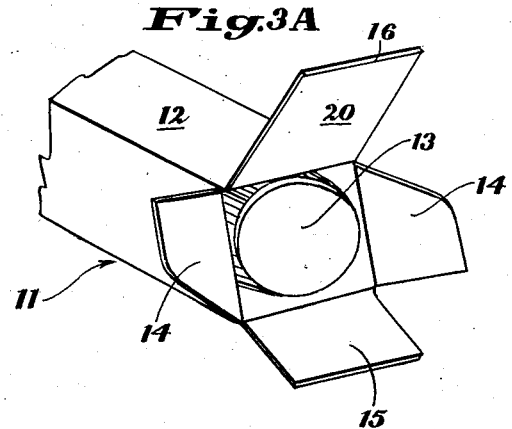
Howard R. DeMallie
INVENTOR.

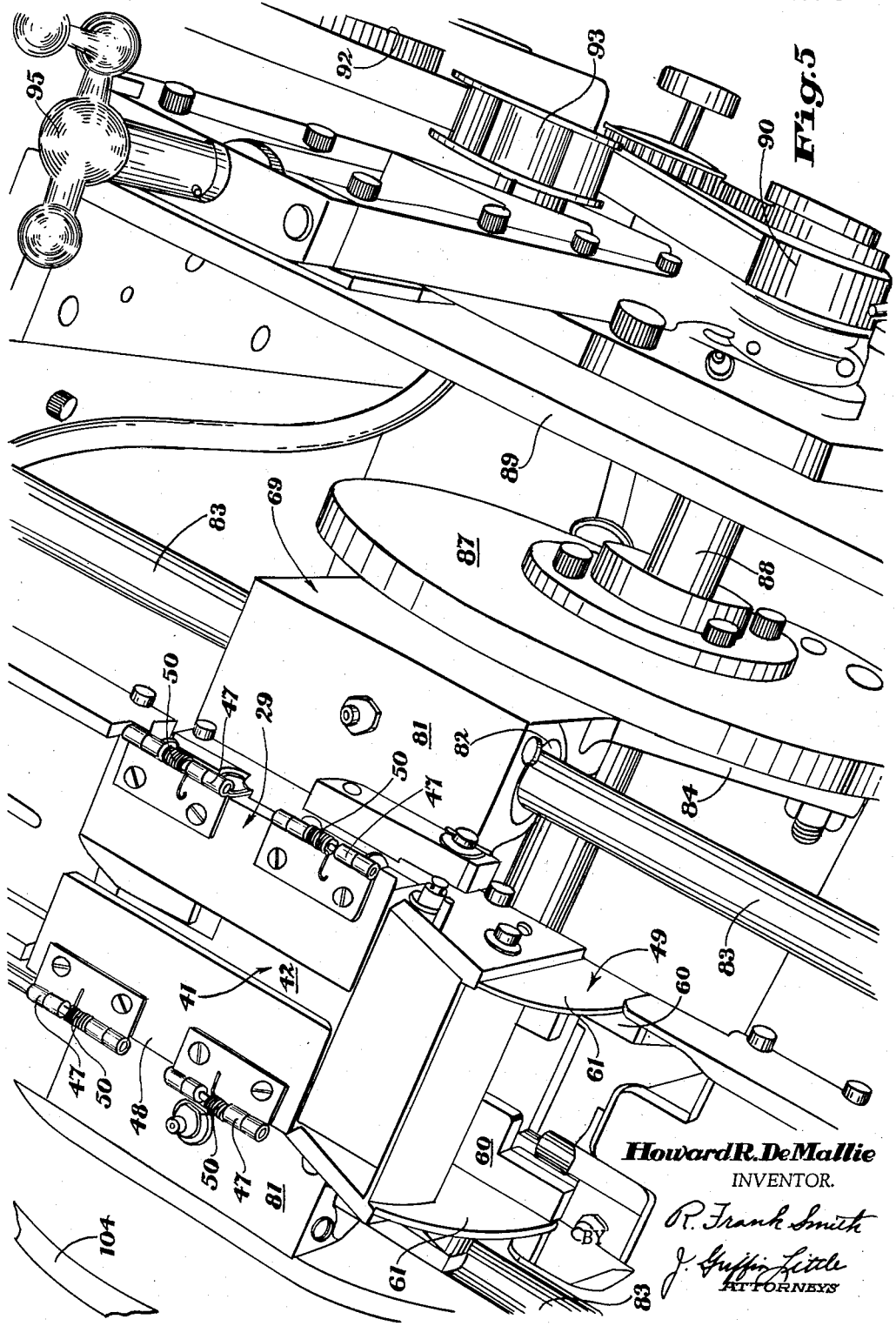

Jan. 17, 1961    H. R. DE MALLIE    2,968,137
METHOD AND APPARATUS FOR FORMING CONNECTED BOXES
Filed Oct. 28, 1957    7 Sheets-Sheet 5
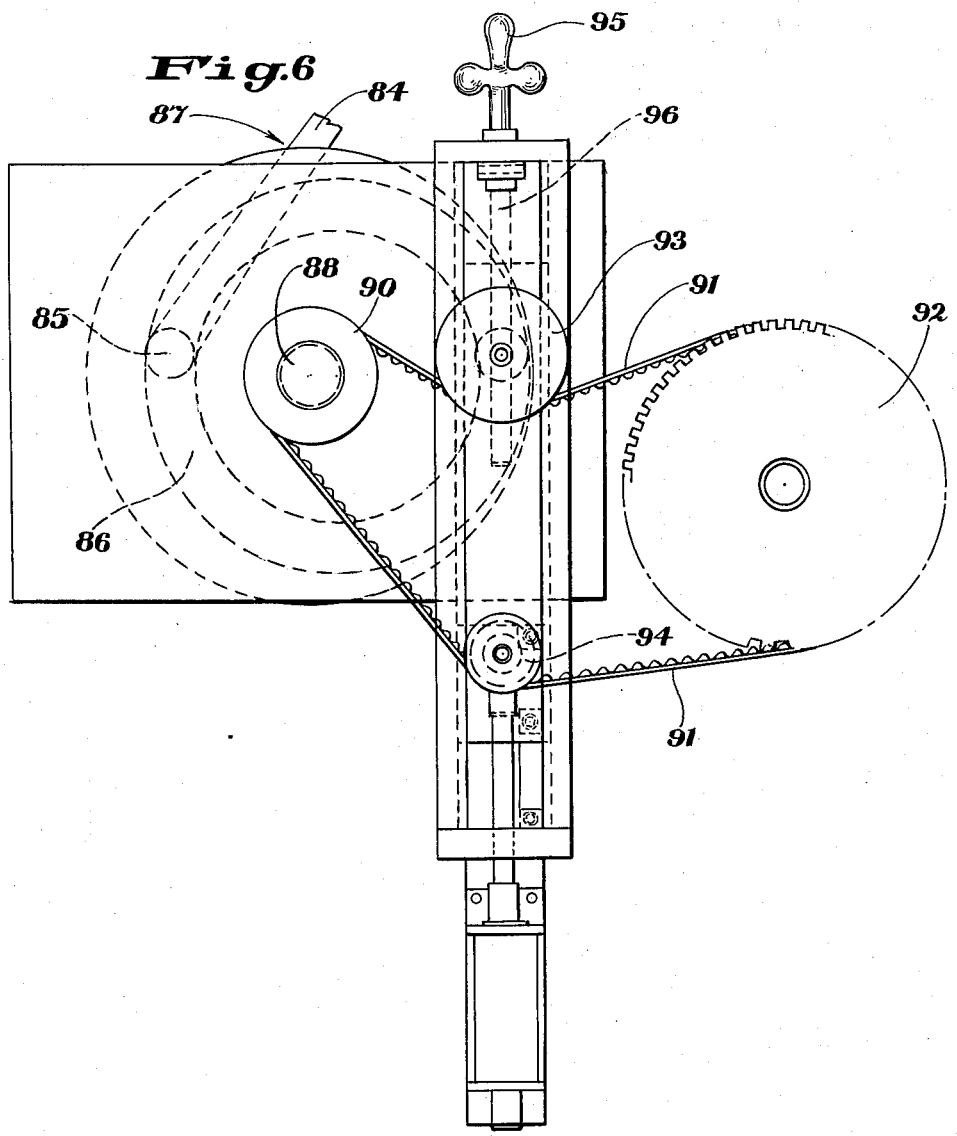
Howard R. DeMallie
INVENTOR.
BY R. Frank Smith
J. Griffin Little
ATTORNEYS

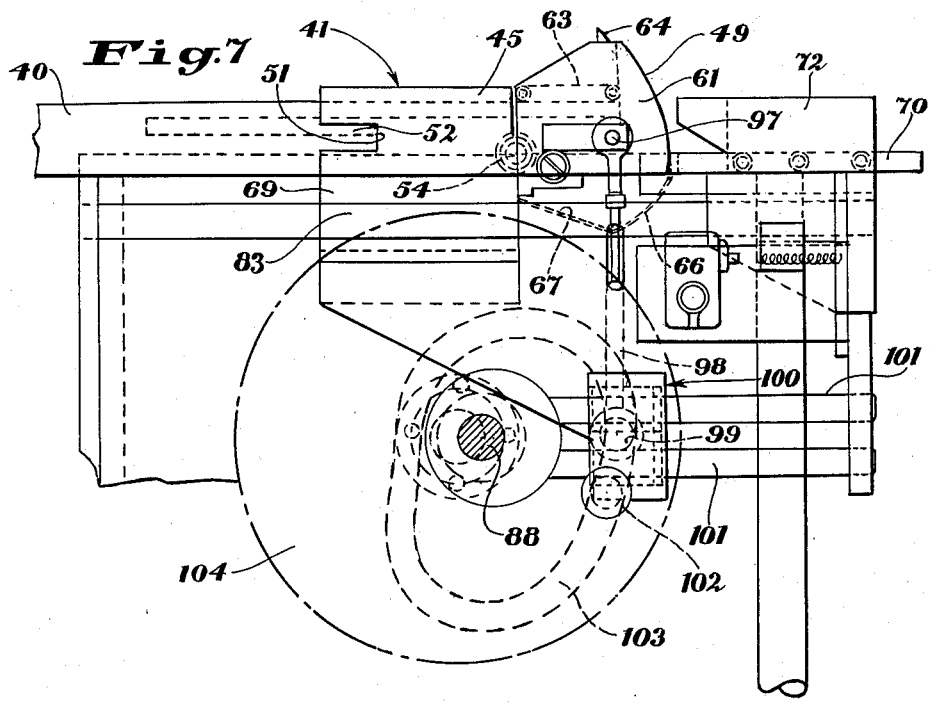
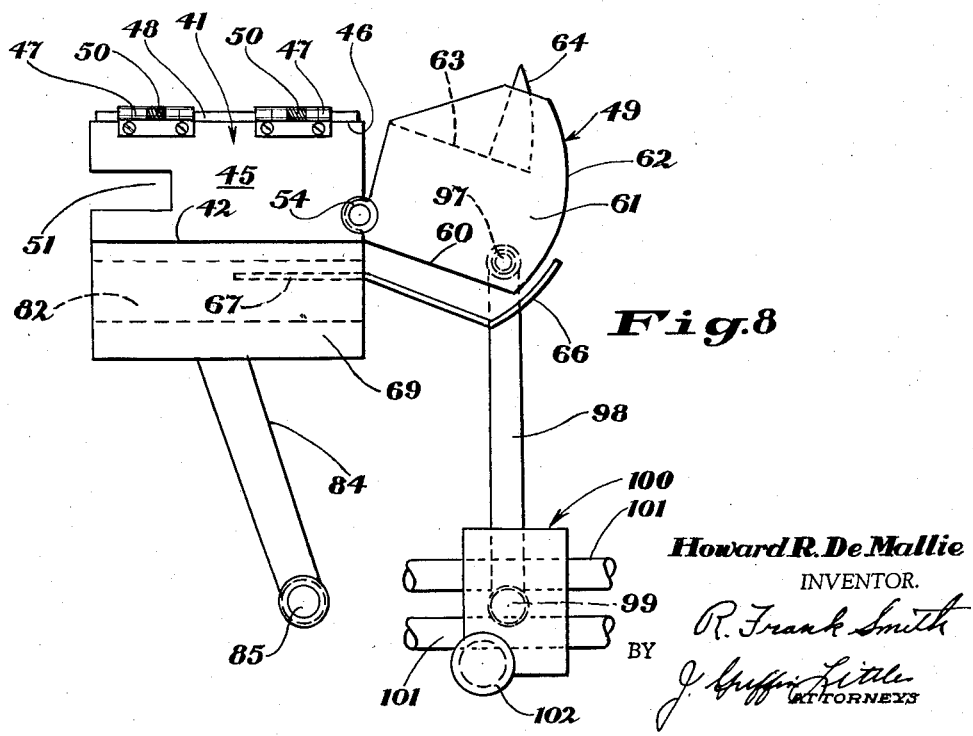

Jan. 17, 1961 H. R. DE MALLIE 2,968,137
METHOD AND APPARATUS FOR FORMING CONNECTED BOXES
Filed Oct. 28, 1957 7 Sheets-Sheet 7

Howard R. DeMallie
INVENTOR.

ved Jan. 17, 1961

United States Patent Office 2,968,137
Patented Jan. 17, 1961

2,968,137

METHOD AND APPARATUS FOR FORMING CONNECTED BOXES

Howard R. De Mallie, Rochester, N.Y., assignor to Eastman Kodak Company, Rochester, N.Y., a corporation of New Jersey Filed Oct. 28, 1957, Ser. No. 692,639

13 Claims. (Cl. 53—14)

The present invention relates to packaging, and more particularly to an arrangement for fastening or connecting a series of boxes or containers in a connected and closely arranged relation, and then separating the connected series of boxes into smaller groups which may be handled as a unit. These separated groups of boxes may be shipped, stored, displayed and sold as a unit. However, the connected boxes which form each unit may be quickly and easily separated into individual boxes by the user, if and when desired.

The principal object of the invention is the provision of apparatus and a method for securing or attaching the boxes in a connected, closely arranged relation, and then separating the connected boxes into individual groups of the desired number of boxes.

Still another object of the invention is the provision of an apparatus and method in which the operations of connecting the boxes, and then separating the boxes into groups of a desired size are performed automatically.

Another object of the invention is the provision of an apparatus and a method by which the connecting and separating are performed in timed sequence.

Still another object of the invention is the provision of a breaker or separating unit of novel design.

And yet another object of the invention is the provision of a breaker unit which operates in timed relation with the forward movement of the group of connected boxes.

And still another object of the invention is the provision of an apparatus of the class described which is relatively simple in structure, rugged, automatic, positive in its operation, and highly satisfactory in use.

To these and other ends, the invention resides in certain improvements and combintaion of parts, all as will be hereinafter more fully described, the novel features being pointed out in the claims at the end of the specification.

In the drawings:

Fig. 2 is a plan view of the discharge end of the belt conveyor, showing the relation thereto of the breaker unit. For purposes of clarity the hinged covers, to be later described, are omitted;

Fig. 3 is a view of a portion of the closely arranged boxes with the tapes applied thereto, and showing the relation of the tapes, and diagrammatically illustrating the stationary arms or fingers which hold the flaps down against the tapes to seal the ends of the boxes. For purposes of clarity, the belt conveyor has been omitted;

Fig. 3A is a partial perspective view of one end of a film container, showing the position of the film roll in the container and the relation of the various end flaps which are folded to seal the end of the container;

Fig. 4 is a vertical sectional view taken substantially on line 4—4, Fig. 3, showing the relation of the box or container in its partly folded condition, and indicating the relation of the tapes and adhesive used to seal the flap;

Fig. 5 is a perspective view of the discharge end of the belt conveyor, on a larger scale than shown in Fig. 2, and showing the breaker unit and the drive and control means therefor;

Fig. 6 is a view taken from the right, Fig. 5, showing the drive means for the breaker and control cams, and showing the contour of the travel cam slot;

Fig. 7 is a view from the left, Fig. 5, showing the breaker unit and the shape of the control groove in the breaker cam;

Fig. 8 is a side view similar to Fig. 7, of the breaker unit itself, detached from the machine, and showing the relation of the breaker unit parts;

Figure 1:
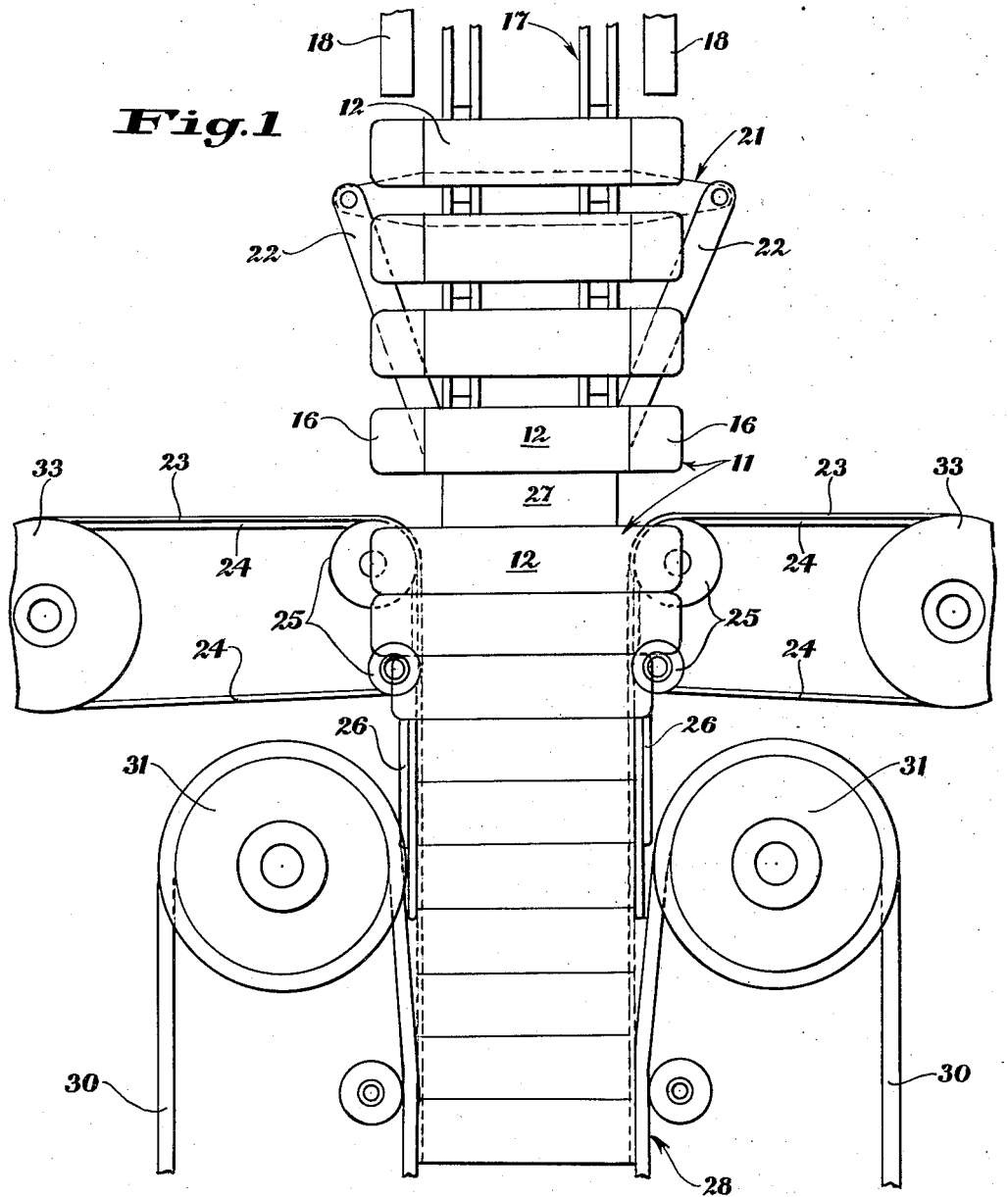
Fig. 1 is a plan view of the feed-in end of the belt conveyor, showing the relation of the tape feeding means for feeding the tapes in relation with the ends of the moving boxes.

The present invention relates to packaging and more particularly to the packaging of a roll of film in the usual or well-known type of box or container, generally indicated by the numeral 11, Fig. 3A. Such a box is usually formed from a piece of cardboard which is suitably scored and folded to form a tubular portion 12 in which a sealed roll of film 13 is inserted. Each end of the tubular portion 12 is provided with what may be termed "side flaps" 14, a bottom flap 15, and a top flap 16. After the roll of film 13 has been positioned in the tubular portion 12, the flaps are folded to close the end of the container, adhesive being applied to one of the flaps, as will be later more fully described, to seal the flaps. Usually, the operation of inserting the film roll into the box and the folding of the flaps is performed automatically, and the sequence of flap folding varies with the particular type of machine used. After the flaps have been folded and sealed, the individually filled containers are usually fed in a separated relation, as shown at the top of Fig. 1, between a pair of moving conveyor belts to move the sealed containers to a point of disposal and also to hold the flaps in folded relation until the applied adhesive has dried. As these operations and the mechanisms therefor form no part of the present invention, details thereof are not disclosed. With the above-described apparatus, the filled and sealed containers are discharged individually from the discharge end of the belt conveyor. Then, a definite number of these individual containers is enclosed in a suitable wrapper, all of which is well known to those in the art.

However, for display, advertising, and sale promotion, it has been found desirable to connect the boxes in groups. The actual number of boxes so connected may be varied to suit the individual conditions. In the present invention, the boxes are preferably arranged in groups of two which are connected together to form a two-box unit, but these two-connected boxes may be quickly and easily separated if and when desired to provide the individual box or container for sale or use. To secure this two-box arrangement, the individual boxes are connected together at their ends by means of continuous bands or tapes to provide a row of connected boxes or containers. Then, the tapes or bands are broken or severed at selected points to provide the two-box structure. The connecting of the boxes by tapes or bands and the breaking of the boxes into groups of two is performed automatically.

In the machine used in connection with the present invention, the above described boxes are so fed that the side flaps 14 are first folded in overlapping relation, and then the bottom flap is folded up as shown in Fig. 4. This partly folded box then appears as shown in Fig. 4, with the upper flap 16 extending outward from the tubular portion 12. As the folding mechanism is old and forms no part of the present invention, this mechanism is not shown or described. The partially folded boxes are fed in spaced relation, as shown at the top of Fig. 1, by means of a suitable conveyor generally indicated by the numeral 17. As the box is then moved by the conveyor 17, the upper flap 16 passes over a revolving gluing wheel 18 which applies a strip or layer 19 of adhesive to the under side 20 of the top flap 16, as best shown in Fig. 4. At this point the boxes are then in separated or spaced relation as shown at the top of Fig. 1. However, to form the desired connected two-box arrangement, it is preferable to position the boxes in closely arranged relation before completing the closing operation, and the application of the tapes and the feeding of the closed box to the drying conveyor. To this end, a reciprocating shuttle, broadly designated by the numeral 21, is formed with a pair of spaced arms 22, which engage the opposite ends of the boxes as shown in Fig. 1 to move the boxes into closely arranged relation, as illustrated at the bottom of Fig. 1. Suffice it to say, that the shuttle 21 operates in timed sequence with the conveyor 17 and the drying belt conveyor, to be presently described, to move the spaced boxes into closely arranged relation.

After the boxes have been moved into this closely arranged relation, the top flap 16 passes under a stationary folding finger 35, one of which is shown in Fig. 3, which gradually folds down the top flap 16 against and in adhesive relation with the lower flap 15, as is deemed apparent from an inspection of Figs. 3 and 4. However, before the upper flap 16 has been thus folded down, a continuous band or tape 23 is applied to each end of the partially folded box and overlies the folded bottom flap 15, as illustrated in Figs. 3 and 4. A separate tape is supplied to each end of the box, and these tapes are supplied from a suitable source, such as supply rolls, not shown, and are fed into position against the opposite side or ends of the boxes by means of belts 24 which are guided over the driven roll 33 and a pair of idler rollers 25, and later being positioned adjacent the box ends, as clearly illustrated in Fig. 1. These tapes are plain and are not adhesively coated, and are merely positioned against the bottom flaps 15 by means of the idler roller 25. The latter rolls and the stationary side guide rails 26, serve to hold the tapes in position during the folding down of the top flaps 16. As the latter are folded down, the adhesive layers 19 engage the bands 23 and the flaps 15 to seal the flaps and to hold the tapes in position between the flaps 15 and 16, as is deemed apparent.

As the boxes are moved in closely arranged relation by the reciprocating shuttle 21, the boxes are supported on a dead plate 27 along which all of the boxes are moved as a unit upon each actuation of the shuttle. The boxes are continuously moved on plate 27 by action of belts 24. The boxes move one box distance per each actuation of the shuttle. After the tapes have been applied, the forward movement of the boxes causes the top flaps 16 to be folded down, as above described. The completely folded boxes with the attached tapes are slidable along and supported by the dead plate 27, and are finally fed to a belt conveyor, generally indicated by the numeral 28, which feeds the closely arranged boxes in a row to a breaker unit, generally indicated by the numeral 29, see Fig. 2. The conveyor 28 comprises a pair of moving belts 30 arranged to engage the opposite ends of the sealed and closed boxes, as shown in Figs. 1 and 2. This belt conveyor is of sufficient length to insure that the flaps are properly adhered before the boxes reach the breaker unit, the advantage of which is deemed apparent. Each belt 30 passes over the idler 31 positioned adjacent the inlet end of the conveyor, see Fig. 1, and a drive pulley 32 positioned adjacent the breaker 29, see Fig. 2. As this belt conveyor construction is well known and forms no part of the present invention, details thereof are not deemed necessary. Each drive pulley 32 for the belt conveyor is driven in any suitable manner from the main machine drive. However, the drive of the pulleys 32, and hence the belts 30, must be in proper relation to the operation of the shuttle 21, but as such timing arrangements are well known, no further details are deemed necessary.

As will be apparent from the above description, the boxes 11, after being filled with the sealed film roll 13, are partly folded and move from a spaced relation to a closely arranged relation in which the tapes or bands are applied to the ends of the boxes and the folding operation is then completed. The completely folded boxes with connecting tapes are moved progressively along the dead plate 27 by moving belts 30 of the conveyor 28. During such movement, the boxes are positioned closely together and are in connected aligned relation by means of the tapes, as above described. In order to secure the desired two-box groups, the continuous row of aligned boxes is fed in continuous relation to the breaker unit, broadly designated by the numeral 29, which acts on the boxes, in a manner to be presently described, to break the tapes 23 between each group of two boxes to provide the desired connected two-box arrangements.

After the boxes pass beyond the conveyor belts 30, they move along a second dead plate 39 by reason of the boxes being moved through the conveyor 28 by belts 30. As the boxes are moved along dead plate 39, the edges of the boxes are held in aligned relation by means of side rails 40 which extend upward from and cooperate with the dead plate 39 to form a channel-shaped member through which the boxes are moving in a closely arranged relation to breaker unit 29.

The breaker unit 29 is positioned beyond and in alignment with the dead plate 39 and comprises in part a channel-like element 41 which serves to guide the boxes to the rockable member 49 of the breaker 29. The element 41 is formed with a bottom 42 which is horizontally aligned with the dead plate 39 and is formed with a slot 43 adapted to receive a forwardly extending tongue 44 on the dead plate 39 to eliminate any gap therebetween when the unit 29 is reciprocated, as will be later described. Side walls 45 extend upward from the bottom 42 and cooperate therewith to form the channel-like guide member 41 which guides the boxes from the dead plate 39 to the rockable member 49. The top edges 46 of the sides 45 have hingedly connected thereto at 47, plates 48 which overlie and are in parallel spaced relation with the bottom 42. The distance between the bottom 42 and plates 48 is just slightly greater than the height of the boxes 11, so the plates will yieldably hold the boxes in position on the bottom 42 and in vertical alignment with the boxes on the conveyor 28. Springs 50 are associated with each hinge 47 and serve to retain the plates 48 in their box covering and engaged relation, shown in Fig. 5.

However, each plate 48 may be swung upward against the action of spring 50 to gain access to the boxes and the bottom 42. Each side wall 45 is provided with a slot 51 adapted to receive a similarly shaped tongue 52 on side rail 40 so as to prevent the formation of any gap or space between 45 and 40. Thus, when the breaker unit is reciprocated, as later described, a continuous path is provided for the boxes between the conveyor 28 and the breaker unit 29.

The forward or right end of the channel shaped guide member 41, as viewed in Figs. 7 and 8, has rockably mounted thereon a breaker member 49 which is movable about aligned pivots 54 carried by the side walls 45 of the member 41. This arrangement enables the member 49 to be rocked about the horizontal pivots 54, as is deemed apparent from Figs. 7 and 8 and for purposes to be later described. While the member 49 may move vertically relative to the wall 45, by reason of pivot 54, the member 49 will also move horizontally as a unit with guide member 41 in a manner to be later described.

The member 49 has a pair of spaced guides 60, Fig. 5, which form the bottom of member 49 to afford a support for a pair of boxes therein. When the member 49 is in its upper position, as shown in Fig. 7, the rails or guides 60 are in alignment with and form a continuation of the bottom 42 of member 41. Side walls 61 of the shape best shown in Figs. 7 and 8, extend upward from the rails 60 and cooperate therewith to form a channel shaped member adapted to receive two boxes, as diagrammatically illustrated in Fig. 9. The forward edges 62 of the walls 61 are curved or arcuate in shape as shown in Fig. 8, and for a purpose to be later described. In addition to the bottom rails 60 and side walls 61, the member 49 has a top wall 63 which corresponds, in general, to plates 48 and is in alignment therewith. The top wall 63 is spaced from the rails 60 a distance slightly greater than the height of the boxes 11 so that a pair of boxes can be positioned on the rails 60 and between the latter and the top 63. A cam member 64 extends above wall 63 and has its ends connected in any suitable manner to the side walls 61 of member 49. A stop member 66 is positioned ahead or to the right of rails 60, as shown in Fig. 8, to hold the boxes 11 on the rails when the member 49 is rocked downward, to be later described. This stop 66 has a tail portion 67 which extends to the left, Fig. 8, and may be secured to the bottom 42 or to a crosshead, generally indicated by the numeral 69.

Figure 9:
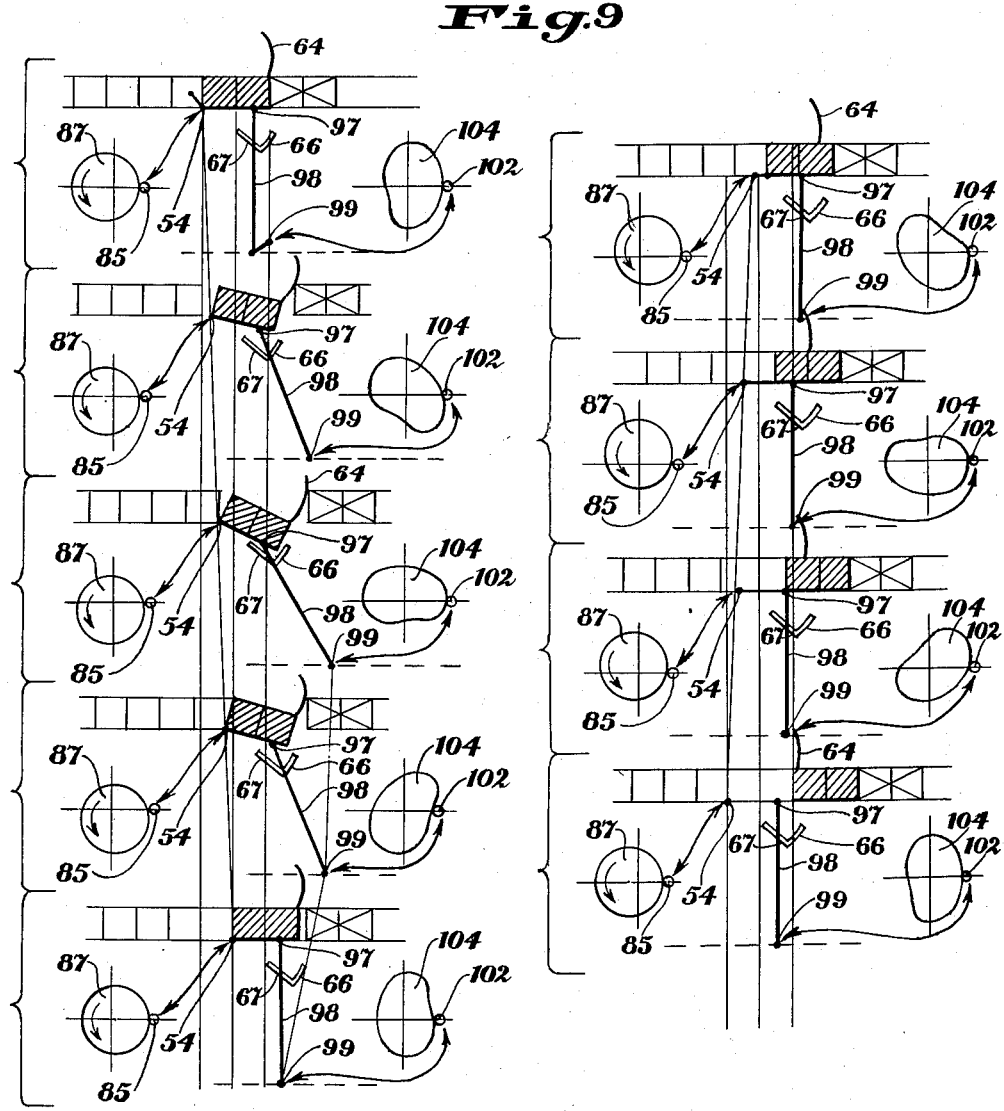
Fig. 9 is a diagrammatic layout showing the relation of the breaker unit and the control cams at different points in the cycle of operation.

In order to separate the row of closely arranged boxes 11, which are connected by tapes or bands 23, a pair of boxes, see Fig. 9, are fed into the breaker member 49 and in a manner to be later described. When these two boxes are positioned in member 49 and arranged between rails 60, and top wall 63, the member 49 has imparted thereto a downward force which serves to rock the member 49 quickly clockwise, as viewed in Fig. 8, about pivots 54. Such downward movement serves to break, rupture or sever the tapes 23 between the two boxes on the member 49 and the adjacent row of connected boxes, the forward ones of which are supported in guide member 41. After the tapes are thus severed, the member 49 is rocked upward to the position in alignment with the bottom 42 and a third dead plate 70 onto which the separated boxes are moved by reason of the forward movement of the row of connected boxes by the belts 30. After the separated boxes have been discharged from the member 49 and onto the dead plate 70, the member 49 must be positioned to receive the next two connected boxes. In order to secure such positioning of a pair of boxes in member 49, the entire breaker unit 29 has imparted thereto a horizontal reciprocating movement.

During the downward rocking movement of the member 49 to break the tapes, and the subsequent return movement of the member 49 to its upward position, the row of attached boxes is being continually moved forward or toward member 49, by means of belts 30, Fig. 7. The parts are so designed that during the downward and upward movement of the member 49, the row of connected boxes is moved forward the distance of one box, as is deemed apparent from the left row of diagrams, Fig. 9. Also, before this pivoted or rocking movement of member 49, the entire breaker unit 29 is also moved horizontally or to the right a distance of one box. Thus, member 49 has a dual movement, one movement to the right the distance of one box and as a unit with member 41, and a second or rocking movement relative to member 41 and about pivots 54. Thus, at the completion of the breaking operation, see lower left diagram, Fig. 9, the entire breaker unit has been moved to the right the distance of one box and the unit has been moved forward at the same speed as the moving boxes.

Now, in order to position the member 49 to receive the next pair of boxes, the entire breaker unit 29 has imparted thereto a unitary horizontal leftward movement. As the box is being continually fed forward, it is only necessary to move the breaker unit 29 to the left the distance of one box, as is deemed apparent from an inspection of the right group of drawings, Fig. 9. Thus, the entire breaker unit has imparted thereto a left and right reciprocating movement to move the breaker unit at the same speed as the moving boxes and the distance of one box in each direction. Thus, in both directions, the movement is the distance of one box, and the speed of movement is equal to that of the moving boxes.

As the member 49 is moved downward to break the tape 23, as pointed out above, the curved, arcuate member 64, which extends forward from the top wall 63, engages the boxes which have been moved onto the dead rail 70 during the preceding cycle and moves these boxes on rail 70 to the right, as illustrated at the left group of Fig. 9, so as to provide room for the boxes on the member 49 when the latter returns to its upward position. Also, member 41 is provided with the above-mentioned stop member which prevents the boxes on member 49 from sliding downward along the rails 60 when member 49 is rocked. Side rails 72 cooperate with the dead rail 70 to receive the discharged boxes and retain the latter in alignment.

In order to impart the dual movement to the member 49, the bottom 42 of member 41 has secured to or formed integral therewith, a crosshead 69 having bearing portions 81 which extend outward on both sides of the unit 29 as best shown in Fig. 5. Each bearing portion 81 has a horizontal aperture 82 in which a guide rod 83 is received. The ends of the rod are suitably anchored in the machine frame.

Thus, the entire breaker unit is mounted and guided for reciprocating horizontal movement on the guide rods 83 which are positioned on opposite sides of the unit 29, as best seen in Fig. 5. An arm 84 depends from the breaker unit 29 and has secured to the lower end thereof, a cam follower 85 which is positioned in a cam slot 86 of a cam 87 mounted on cam shaft 88. The latter extends through a main frame 89 and has mounted on the outer end thereof a sprocket 90 which is connected by a timing belt 91 to a drive gear 92, which, in turn, is driven from the main machine drive and in proper timed relation thereto so the unit 41 is moved in proper sequence with the shuttle 21 and the conveyor belts 30. As such relations of the various drives are readily apparent to an engineer, or mechanic, details thereof are not deemed necessary. Suffice it to say, that the shaft 88 is driven at one-half the speed of the main drive shaft which also drives the pulley 32 for the conveyor belts 30. Adjustable idler pulleys 93 and 94 are provided to maintain tension of the timing belt 91, and to provide means to time the breaker unit with the machine delivery of the boxes. To adjust the timing of the breaker unit, pulley 94 is temporarily unlocked and allowed to float vertically. The air cylinder then maintains the belt tension by drawing down on pulley 94. Pulley 93 is then repositioned by crank 95 and the timing belt 91 rotates driven pulley 90 relative to drive pulley 92 which changes the breaker motion relative to the machine cycle. This timing adjustment can be made while the machine is operating. The position of the pulleys 93 and 94 may be adjusted by means of a handle 95 which engages a threaded member 96 suitably connected to pulleys 93 or 94. As various adjusting mechanisms may be porvided, further details thereof are not deemed necessary. Thus, as gear 92 is rotated, the cam shaft 88 is also rotated to rotate cam 87 which through cam slot 86 and cam follower 85 and crosshead 81 imparts a reciprocating movement to the breaker unit 29. The parts are so designed that the breaker unit moves forward and backward the distance of one box at the same speed as the movement of the boxes, as mentioned above.

In order to impart the rocking movement to the member 49, the left wall 61 of the latter, Figs. 5 and 8, has pivotally connected thereto at the point 97, a depending arm 98. The pivot 97 is in advance or to the right of the pivot 54, as viewed in Figs. 7 and 8. The lower end of arm 98 has pivotally connected thereto at 99, a crosshead 100 which is slidable on a pair of rails 101 connected to the machine frame, in any suitable manner. Crosshead 100 carries a cam follower 102 which is slidable in a cam slot 103 in a cam 104 carried by shaft 88, Fig. 7. Thus, the rotation of cam shaft 88 rotates both cams 87 and 104, the former serving to impart uniform reciprocating movement to the entire unit, while cam 104 serves to impart a rocking or pivoting movement to the breaker 49 to break the tapes.

By means of this movement, the connected rows of aligned boxes which are being fed or moved by the conveyor 28 are broken or separated in groups of two connected boxes. Also, the rocking movement of the member 49 serves to bring the cam member 64 into engagement with the previously discharged boxes on the dead rail 70 to move these boxes to the right and to a suitable point of packaging, not shown.

The present invention thus provides apparatus by which individual boxes or cartons are connected at their ends in a continuous row by means of endless tapes. Then the connected boxes are separated into groups of two connected boxes. Each group of two boxes may be separated easily and quickly merely by bending the boxes relative to each other to sever or break the bands therebetween. The breaking mechanism of the present invention is simple, rugged, automatic, comprises few parts and is highly effective. While the present invention has been illustrated in connection with a mechanism to form groups of two boxes, it is apparent this is by way of illustration only, and that by varying the speed and size of the parts any number of boxes may be separated.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. The method of forming separate groups of connected boxes comprising, in combination, feeding the boxes in closely arranged relation, applying rupturable bands to the ends of the closely arranged boxes to arrange the latter in connected relation in a row, moving the connected row of boxes in one direction and at one speed, and simultaneously moving a group of boxes at the leading end of said row in another direction and at a different speed to rupture said bands between said row and said group to separate the latter from said row.

2. The method of forming separate groups of connected boxes comprising, in combination, feeding the boxes in closely arranged relation, applying rupturable bands to the ends of the closely arranged boxes to arrange the latter in connected relation in a row, moving the connected row of boxes in one direction and at one speed, and simultaneously moving a group of boxes at the leading end of said row in a direction normal to said first direction and at an increased speed to rupture said bands between said row and said group to separate the latter from said row.

3. The method of forming separate groups of connected boxes comprising, in combination, feeding the boxes in closely arranged relation, applying rupturable bands to the ends of the closely arranged boxes to arrange the latter in connected relation in a row, moving the connected row of boxes in one direction and at one speed, and simultaneously moving a group of boxes at the leading end of said row in a direction normal to said first direction and at a speed greater than said first speed, to rupture the bands between said row and said group to separate the latter from said row.

4. The method of forming separate groups of connected boxes comprising, in combination, feeding the boxes in closely arranged relation, applying rupturable bands to the ends of the closely arranged boxes to arrange the latter in connected relation in a row, moving the connected row of boxes in one direction and at one speed, and simultaneously moving a group of boxes at the leading end of said row in a direction normal to said first direction and at a speed greater than said first speed and while moving in said one direction at said first speed to rupture the bands between said row and said group of boxes to separate the latter from said row.

5. In a machine for forming separate groups of connected boxes, the combination comprising, means to feed the boxes in closely arranged relation, means to apply bands to the opposite ends of said boxes to arrange the latter in a connected relation in a row, movable breaker means associated with a group of boxes at the leading end of said row, means to move said breaker means in the direction of said row and at the speed of the fed boxes, and means to rapidly move said breaker means in another direction transverse to the direction of movement of said row to rupture the bands between said group and said row to separate said leading group of boxes from said row.

6. In a machine for forming separate groups of connected boxes, the combination comprising, means to feed the boxes in closely arranged relation, means to apply bands to the opposite ends of said boxes to arrange the latter in a connected relation in a row, breaker means associated with a group of boxes at the leading end of said row, means to move said breaker means and said leading group of boxes as a unit in the direction of said row movement and at the same speed as the boxes being fed by said feeding means, and means to move said leading breaker means and said group of boxes simultaneously in another direction at a speed faster than said first speed to rupture the bands between said row and said leading group of boxes to separate the latter from said row.

7. In a machine for forming separate groups of connected boxes, the combination comprising, means to feed the boxes in closely arranged relation, means to apply bands to the opposite ends of said boxes to arrange the latter in a connected relation in a row, breaker means associated with a group of said row, means to move said breaker means and said group as a unit in the direction of said row movement and at the same speed as the boxes being fed by said feeding means, and means to impart a rapid movement to said breaker means in a direction normal to said first direction while said breaker means and said group are also moving in said one direction at said speed to cause the bands between said row and said group to be ruptured to separate the groups from said row.

8. In a machine for forming separate groups of connected boxes, the combination comprising, means to feed the boxes in closely arranged relation, means to apply bands to the opposite ends of said boxes to arrange the latter in a connected relation in a row, a breaker unit associated with and supporting a group of boxes in said row, means to move said unit and group in the direction of movement of and at the speed of said row, and means to impart a rapid oscillating movement to said unit in a direction normal to said first direction as the unit is being moved in the direction of and at the speed of said row to move said group in said second direction relative to said row to rupture the bands between said row and said group to separate the latter from said row.

9. In a machine for forming separate groups of connected boxes, the combination comprising, means to feed the boxes in closely arranged relation, means to apply bands to the opposite ends of said boxes to arrange the latter in a connected relation in a row, a breaker unit associated with a group of boxes in said row, means to move said unit in the direction of movement of and at the speed of said row, means to impart a rapid oscillating movement to said unit in a direction normal to said first direction as the unit is being moved in the direction of and at the speed of said row to move said group in said second direction relative to said row to rupture the bands between said row and said group to separate the latter from said row, and means on said unit for retaining the group in proper relation thereto during said oscillating movement.

10. In a machine for forming separate groups of connected boxes, the combination comprising, means to feed the boxes in closely arranged relation, means to apply bands to the opposite ends of said boxes to arrange the latter in a connected relation in a row, a breaker unit associated with a group of boxes in said row, means to move said unit in the direction of movement of and at the speed of said row, means to impart a rapid oscillating movement to said unit in a direction normal to said first direction as the unit is being moved in the direction of and at the speed of said row to move said group relative to said row to rupture the bands between said row and said group to separate the latter from said row, means on said unit for retaining the group in proper relation thereto during said oscillating movement, and means on said unit and operated during the oscillating movement thereof to engage and advance a previously separated group to provide clearance for the group carried by and separated by said unit.

11. In a machine for forming separate groups of connected boxes, the combination comprising, means to feed the boxes in closely arranged relation, means to apply bands to the oppposite ends of said boxes to arrange the latter in a connected relation in a row, a breaker unit arranged at the discharge end of said row, cam means to move said unit in the direction of and at the speed of the boxes being fed in said row, a portion on said unit positioned to receive a group of boxes in said row, means to mount said portion on said unit for movement in a direction normal to said first direction, and cam means connected to said portion to impart a rapid movement to said portion and said group in said normal direction simultaneously with the movement of said breaker unit and said portion at said speed and in said first direction to cause the bands between said row and group to be ruptured to separate said group from said row, the movement of said boxes in said row serving to discharge the severed group from said portion, said last-mentioned cam then moving said unit at said one speed and in a direction opposite said first direction to move said portion into receiving relation with the next group of said row.

12. In the handling of a row of boxes in closely arranged relation wherein the boxes are connected together in the row by a rupturable tape, the method of forming separate groups of connected boxes, comprising: moving the connected row of boxes in one direction at one speed and, while so abruptly moving said row, moving an end group of the boxes in the row in another direction transverse to said one direction and at a rate of speed differing from said one speed, thereby rupturing the connection between a box of said group and an adjacent box in the row.

13. Apparatus for forming separate groups of connected boxes from a row of said boxes attached together by a rupturable tape, comprising: means for moving said row of boxes in one direction at one speed, and means abruptly moving an end group of articles in the row in another direction transverse to said one direction and at a speed differing from said one speed to rupture the tape connection between one box of the group and the adjacent box of the row.

References Cited in the file of this patent

UNITED STATES PATENTS

| | | |
|---|---|---|
| 744,244 | Semmer | Nov. 17, 1903 |
| 1,401,268 | Manischewitz | Dec. 27, 1921 |
| 1,468,333 | Thom | Sept. 18, 1923 |
| 2,537,464 | Holmberg | Jan. 9, 1951 |
| 2,641,318 | Brady | June 9, 1953 |
| 2,687,978 | Vogt | Aug. 31, 1954 |